United States Patent
Zheng et al.

(10) Patent No.: US 8,606,116 B2
(45) Date of Patent: Dec. 10, 2013

(54) SYSTEM AND METHOD FOR DISTORTION COMPENSATION IN RESPONSE TO FREQUENCY DETECTION

(75) Inventors: Jun Zheng, Houston, TX (US); Yi Wang, Katy, TX (US); Chuan Peng, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 425 days.

(21) Appl. No.: 13/005,820

(22) Filed: Jan. 13, 2011

(65) Prior Publication Data

US 2012/0183299 A1  Jul. 19, 2012

(51) Int. Cl.
*H04B 10/00* (2013.01)

(52) U.S. Cl.
USPC ........... 398/194; 398/147; 398/158; 398/193; 375/296

(58) Field of Classification Search
USPC ......... 398/158–159, 181, 194–195, 147, 193; 375/260, 296
See application file for complete search history.

(56) References Cited

U.S. PATENT DOCUMENTS

| | | | |
|---|---|---|---|
| 4,068,186 A | 1/1978 | Sato et al. | |
| 4,992,754 A | 2/1991 | Blauvelt et al. | |
| 5,132,639 A | 7/1992 | Blauvelt et al. | |
| 5,249,201 A | 9/1993 | Posner et al. | |
| 5,252,930 A | 10/1993 | Blauvelt | |
| 5,321,710 A | 6/1994 | Cornish et al. | |
| 5,361,156 A | 11/1994 | Pidgeon | |
| 5,418,637 A | 5/1995 | Kuo | |
| 5,424,680 A | 6/1995 | Nazarathy et al. | |
| 5,436,749 A | 7/1995 | Pidgeion, Jr. et al. | |
| 5,481,389 A | 1/1996 | Pidgeion et al. | |
| 5,600,472 A | 2/1997 | Uesaka | |
| 5,703,530 A | 12/1997 | Sato et al. | |
| 6,055,278 A | 4/2000 | Ho et al. | |
| 6,061,161 A | 5/2000 | Yang et al. | |
| 6,075,411 A | 6/2000 | Briffa et al. | |
| 6,122,085 A | 9/2000 | Bitler | |
| 6,133,790 A | 10/2000 | Zhou | |
| 6,388,518 B1 | 5/2002 | Miyatani | |
| 6,741,128 B2 | 5/2004 | Okubo et al. | |
| 6,757,525 B1 | 6/2004 | Ishikawa et al. | |
| 6,759,897 B2 | 7/2004 | Ciemniak | |
| 6,917,764 B1 | 7/2005 | Wilson | |
| 6,919,765 B2 | 7/2005 | Zappala | |
| 6,943,628 B2 | 9/2005 | Weldon | |

(Continued)

OTHER PUBLICATIONS

Applied Optoelectronics, Inc., "DFB-1310-P3-xx-A3-xx Laser Module", Applied Optoelectronics, Inc. 2006, pp. 1-6.

(Continued)

*Primary Examiner* — Leslie Pascal
(74) *Attorney, Agent, or Firm* — Grossman Tucker Perreault & Pfleger, PLLC; Norman S. Kinsella

(57) ABSTRACT

A distortion compensation circuit with frequency detection may be used with one or more non-linear elements, such as a laser, to compensate for frequency-dependent distortion generated by the non-linear element(s), for example, in broadband multichannel RF applications. Embodiments of the distortion compensation circuit may include a frequency detector circuit that detects changes in frequency loading conditions in the distortion compensation circuit such that distortion compensation may be adjusted to compensate for distortion under different frequency loading conditions. In a multichannel RF system with multiple channel operation modes, for example, the frequency detector circuit may detect changes in the frequency loading condition as a result of changing operation modes.

25 Claims, 4 Drawing Sheets

(56) References Cited

U.S. PATENT DOCUMENTS

| | | |
|---|---|---|
| 7,466,925 B2 | 12/2008 | Ianelli |
| 7,925,170 B2 | 4/2011 | Ishaug |
| 2001/0054927 A1 | 12/2001 | Zhou et al. |
| 2003/0020540 A1 | 1/2003 | Johnson |
| 2006/0262880 A1 | 11/2006 | Mizuta et al. |
| 2008/0187035 A1 | 8/2008 | Nakamura et al. |
| 2009/0041474 A1 | 2/2009 | Ishaug |
| 2009/0196629 A1 | 8/2009 | Zheng |
| 2010/0295612 A1 | 11/2010 | Ohkawara et al. |
| 2011/0002428 A1 | 1/2011 | Erickson |

OTHER PUBLICATIONS

Applied Optoelectronics, Inc., "DFB-1310-P2-xx-A3-xx Predistorted Laser Transmitter", Applied Optoelectronics, Inc. 2005, pp. 1-5.

Applied Optoelectronics, Inc., "DFB-1xxx-P3-xx-A3-xx Laser Module", Applied Optoelectronics, Inc. 2006, pp. 1-8.

International Search Report and Written Opinion dated Mar. 30, 2009 issued in related International Patent Application No. PCT/US2009/033175.

Office Action dated Mar. 1, 2011 received in U.S. Appl. No. 12/026,182.

Office Action dated Mar. 3, 2011 received in U.S. Appl. No. 12/025,883.

Linear Technology, "LT5534 -50 MHz to 3GHz RF Power Detector with 60dB Dynamic Range," available at http://cds.linear.com/docs/Datasheet/5534fc.pdf, retrieved on Jul. 27, 2011.

Scientific Atlanta, "Optoelectronics Prisma II 1 GHz 1550 nm Transmiters," available at http://tulsat.com/productImages/DownloadFiles/1GHz_1550.pdf; retrieved on Jul. 27, 2011.

Cisco, "Prisma II 1 GHz SuperQAM Transmitter," available at www.cisco.com/en/US/prod/collateral/video/ps8806/. . . /7019211b.pdf, retrieved on Jul. 27, 2011.

Office Action dated Mar. 8, 2010 received in U.S. Appl. No. 11/834,873.

Notice of Allowance dated Dec. 8, 2010 received in U.S. Appl. No. 11/834,873.

International Search Report and Written Opinion mailed Jun. 15, 2012, received in corresponding PCT Application No. PCT/US2011/064870, 8 pgs.

SYSTEM AND METHOD FOR DISTORTION COMPENSATION IN RESPONSE TO FREQUENCY DETECTION

TECHNICAL FIELD

The present invention relates to distortion compensation and more particularly, to detecting frequency loading conditions that affect distortion compensation in a multichannel RF system with multiple channel modes and adjusting distortion compensation in response to the detected frequency loading conditions.

BACKGROUND INFORMATION

A directly modulated laser may be used as an optical transmitter that transmits light at a given wavelength. The power (i.e., amplitude) of the laser light is modulated by corresponding modulation of the current used to drive the laser. For example, the optical transmitter may be modulated to carry a wide-band multichannel RF signal. In this case, the electrical current that drives or pumps the laser is modulated with the wide-band multichannel RF signal.

The use of a directly-modulated laser to carry a wide-band multichannel RF signal may result in distortion due to the multiple carrier frequencies of the multichannel RF signal modulating the laser and/or the harmonics produced by the non-linear nature of the laser device. Intermodulation distortion may be produced when two or more signals (e.g., 2 or more carriers) mix together to form distortion products. Distortion may include even-order distortion (e.g., second-order distortion products) and odd-order distortion (e.g., third-order distortion products).

Second-order intermodulation ($IM_2$) distortion products may include, for example, intermodulation products formed by combining signals at frequencies A and B to produce new signals at the combined frequencies, such as A±B. The sum of second-order intermodulation products that are present at a particular frequency is commonly referred to as composite second order (CSO) distortion. Third-order intermodulation ($IM_3$) distortion products may include, for example, intermodulation products formed by combining signals at frequencies A, B, and C to produce new signals at frequencies A±B±C and 2A±B. The sum of these third-order intermodulation products that are present in a particular channel is commonly referred to as composite triple beat (CTB) distortion.

Several techniques have been proposed or employed to compensate for distortion by injecting distortion of equal magnitude but opposite phase to the distortion produced by the laser device. A predistortion circuit may be employed, for example, to predistort the RF signal being applied to modulate the laser. One such predistortion circuit includes split signal paths—a main or primary signal path and a secondary signal path. A small sample of the RF input is tapped off the main signal path and a distortion generator circuit in the secondary signal path generates compensating distortion (i.e., predistortion). The predistortion is then combined with the RF signal on the primary signal path such that the predistortion is of equal magnitude but opposite sign to the laser-induced distortion.

Certain types of distortion are frequency dependent, and thus compensating distortion may not compensate for distortion at a wide range of frequency loading conditions. Distortion compensation techniques have been developed for frequency-dependent distortion, for example, as described in U.S. Patent Application Publication Nos. 2009/0041474 and 2009/0196629, which are fully incorporated herein by reference. Existing distortion compensation circuits do not, however, effectively detect changes in frequency loading conditions and adjust the distortion compensation in response to the detected changes.

BRIEF DESCRIPTION OF THE DRAWINGS

These and other features and advantages will be better understood by reading the following detailed description, taken together with the drawings wherein.

DETAILED DESCRIPTION

A distortion compensation circuit with frequency detection, consistent with embodiments of the present invention, may be used with one or more non-linear elements, such as a laser, to compensate for frequency-dependent distortion generated by the non-linear element(s), for example, in broadband multichannel RF applications. Embodiments of the distortion compensation circuit may include a frequency detector circuit that detects changes in frequency loading conditions in the distortion compensation circuit such that distortion compensation may be adjusted to compensate for distortion under different frequency loading conditions. In a multichannel RF system with multiple channel operation modes, for example, the frequency detector circuit may detect changes in the frequency loading condition as a result of changing operation modes.

Distortion compensation circuits may include predistortion circuits, which generate compensating distortion before the non-linear element(s), for example, in an optical transmitter. Distortion compensation circuits may also include post-distortion circuits, which generate compensating distortion after the non-linear element(s), for example, in an optical receiver. Although some of the exemplary embodiments may refer specifically to predistortion circuits, the concepts described herein may be used with predistortion compensation, postdistortion compensation, or a combination thereof. Thus, distortion compensation circuits, consistent with the embodiments described herein, may be used to compensate for distortion produced by one or more non-linear elements before and/or after the distortion compensation circuits.

Figure 1:
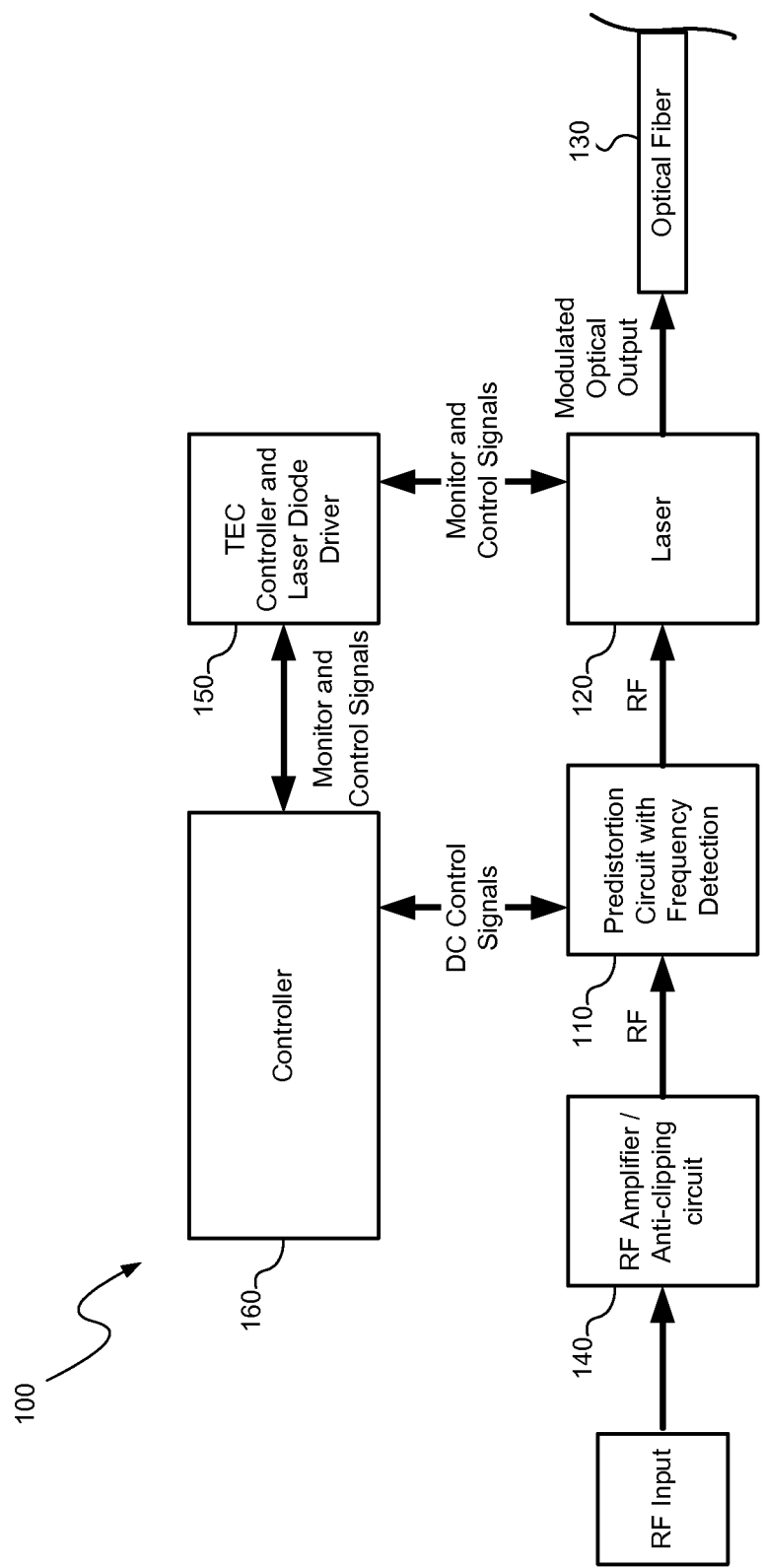
FIG. 1 is a schematic block diagram of an optical transmitter including a predistortion circuit, consistent with an embodiment of the invention.

Referring to FIG. 1, an optical transmitter 100 may include a predistortion circuit 110 to generate predistortion that compensates for distortion produced by one or more non-linear elements, such as a laser 120 and/or an optical fiber 130, when a multichannel RF signal modulates the laser 120 to produce a modulated optical output coupled into the optical fiber 130. As used herein, "compensate" or "compensating" for distortion means reducing distortion to a point that is tolerable in a particular system and does not necessarily require elimination of distortion. To compensate for distortion produced by the laser 120, optical fiber 130 and/or other non-linear elements such as amplifier non-linearities, the predistortion may be generated by the predistortion circuit 110 with a magnitude substantially equal to the magnitude of the distortion produced by the laser 120, optical fiber 130 and/or other non-linear elements and a phase that is substantially opposite the phase of the distortion produced by the laser 120, optical fiber 130 and/or other non-linear elements.

The multichannel RF signal may include multiple superimposed modulated analog carriers at different frequencies. The multiple modulated analog carriers may be modulated using modulation techniques known to those skilled in the art, such as amplitude modulation, and may be combined using multiplexing techniques known to those skilled in the art, such as frequency division multiplexing. The multichannel RF signal may also include one or more digital signals modulated using digital modulation, such as quadrature amplitude modulation (QAM). The resulting multichannel RF signal occupies a bandwidth across the range of frequencies of the multiple modulated carriers. Those skilled in the art will recognize that various modulation and multiplexing techniques may be used to generate the multichannel RF signal.

The optical transmitter 100 may support multiple channel operation modes or channel plans, which cause the multichannel RF signal to be transmitted within different ranges of frequencies and thus provide different frequency loading conditions. One example of the optical transmitter 100 is a 1 GHz QAM transmitter that provides different channel plans or QAM modes, such as the type available from CISCO under the name Prisma II 1 GHz SuperQAM transmitter, which provides QAM channel plans or modes with 16, 32, 50 or 153 QAM channels. In such a transmitter, for example, the 16, 32, 50, and 153 channel modes may each occupy a different frequency range, for example, between 50 MHz and 1 GHz, and thus result in different frequency loading conditions. The frequency loading condition may be in the range of about 500 MHz to 850 MHz in one mode, for example, and in the range of about 700 MHz to 1 GHz in another mode.

The predistortion circuit 110 is capable of detecting changes in the frequency loading condition produced by the multichannel RF signal (e.g., as a result of changing the channel modes) and adjusting the generation of predistortion responsive to changes in the frequency loading condition. The predistortion circuit 110 then combines the predistortion with the multichannel RF signal to produce a predistorted RF signal that modulates the laser 120. The laser 120 may be a directly-modulated electrically pumped semiconductor laser, such as a laser diode.

According to one embodiment, the optical transmitter 100 may include an RF amplifier/anti-clipping circuit 140 to receive and amplify the multichannel RF signal and/or to modify the multichannel RF signal to prevent or reduce clipping in the laser 120. Examples of anti-clipping circuits are described in greater detail in commonly-owned U.S. Patent Application Publication Nos. 2009/0278583, 2008/0292324 and 2008/0292323, which are incorporated herein by reference. The predistortion circuit 110 may then receive the amplified RF signal, generate the predistortion from the RF signal, and combine the predistortion with the RF signal to produce the predistorted RF signal that modulates the laser 120.

One embodiment of the optical transmitter 100 may further include thermo-electric cooler (TEC) controller and laser diode driver circuitry 150 to control the temperature of and to bias the laser 120. A controller 160, such as a microprocessor, may be used to control the components and the operation of the optical transmitter 100. The TEC controller and laser diode driver circuitry 150 and the microcontroller 160 may include components known to those skilled in the art for use in a laser transmitter, such as the type available from Applied Optoelectronics, Inc.

The embodiments described herein have particular application in QAM systems with different channel plans or QAM modes, although they could be applied to any system in which different frequency loading conditions result in differences in distortion. The distortion compensation circuits and methods described herein may also be used in other applications (e.g., using different or even higher frequencies) and/or with other types of optical transmitters. Embodiments of the distortion compensation circuits may also be used with any non-linear element or device generating distortion that can be compensated with predistortion or postdistortion.

Figure 2:
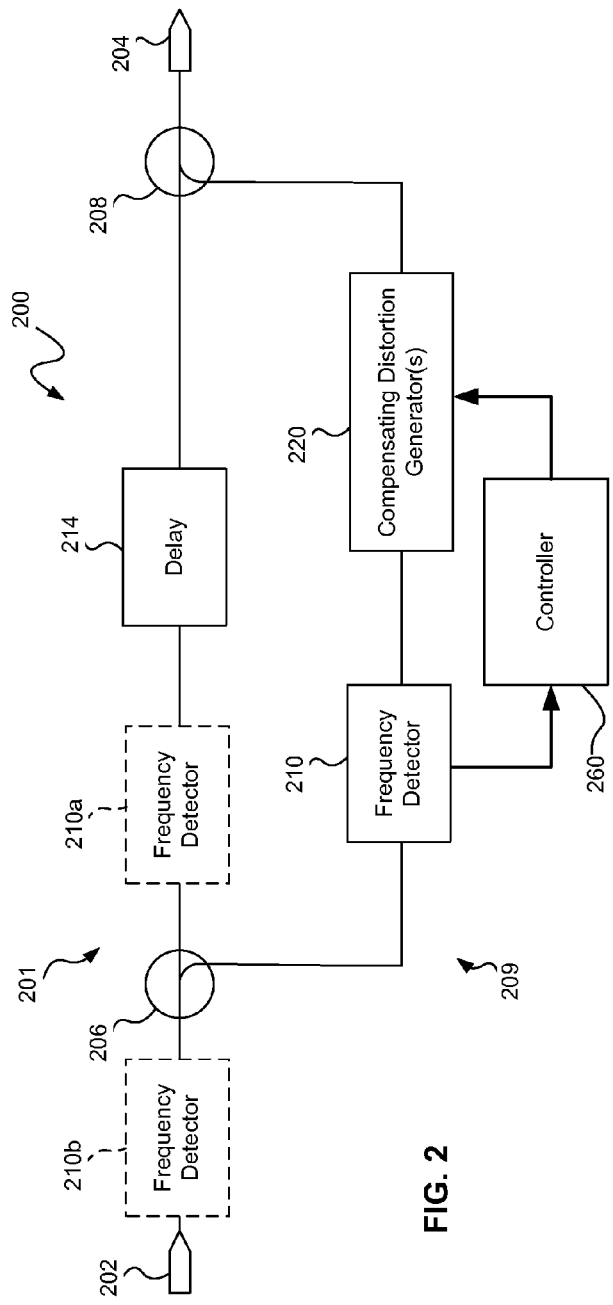
FIG. 2 is a schematic block diagram of a distortion compensation circuit including frequency detection, consistent with an embodiment of the invention.

Referring to FIG. 2, a distortion compensation circuit 200, consistent with an embodiment of the present invention, is described in greater detail. The distortion compensation circuit 200 receives a multichannel RF signal at a signal input 202, generates compensating predistortion and/or postdistortion, and provides the RF signal combined with the compensating predistortion and/or postdistortion at a signal output 204. The distortion compensation circuit 200 may include a primary signal path 201 and a secondary signal path 209 that are coupled together, for example, using directional couplers such as a directional splitter 206 and a directional combiner 208. At the directional splitter 206, at least a portion of the RF signal power is received on the primary and secondary signal paths 201, 209, respectively.

The secondary signal path 209 includes one or more compensating distortion generator circuits 220 that generate the intermodulation distortion products from the multichannel RF signal received on the secondary signal path 209. In an embodiment of the distortion compensation circuit 200 that compensates for composite triple beat (CTB) distortion, the compensating distortion generator circuit(s) 220 may include CTB distortion generating circuitry that generates third-order intermodulation products capable of compensating CTB distortion. CTB distortion generating circuitry does not necessarily generate only third-order distortion. CTB distortion generating circuitry may include distortion generating circuitry that produces odd-order distortion with predominantly third-order distortion.

In other embodiments, the distortion compensation circuit(s) 200 may also compensate for composite second order (CSO) distortion in addition to or instead of CTB. In these embodiments, the compensating distortion generator circuit(s) 220 may include CSO distortion generating circuitry that generates second-order intermodulation distortion products capable of compensating CSO distortion. CSO distortion generating circuitry may include distortion generating circuitry that produces even-order distortion with predominantly second-order distortion. Similarly, higher orders of intermodulation distortion may also be compensated. Although a single secondary path 209 is shown with the compensating distortion generator circuit(s) 220, multiple secondary paths may be provided with distortion generator circuits on each of the paths. Distortion compensation circuits and distortion generating circuitry are described in greater detail in U.S. Patent Application Publication Nos. 2009/0196630, 2009/0196629, and 2009/0041474, which are incorporated herein by reference.

At the directional combiner 208, intermodulation distortion products produced on the secondary signal path 209 are combined with the multichannel RF signal on the primary signal path 201 with a desired magnitude and phase to compensate for distortion. Where the distortion compensation circuit is a predistortion circuit, the intermodulation distortion products provide compensating predistortion combined with the RF signal to produce a predistorted RF signal that compensates for distortion generated by one or more non-linear elements (not shown) following the distortion compensation circuit 200. Where the distortion compensation circuit 200 is a postdistortion circuit, the intermodulation distortion products provide compensating postdistortion combined with the RF signal to compensate for the distortion already caused by one or more non-linear elements (not shown) located before the distortion compensation circuit 200.

The primary signal path 201 may include a delay element or segment 214 that delays the multichannel RF signal on the primary signal path 201 to correspond substantially to the delay caused by generating the compensating distortion on the secondary signal path 209. Such a delay helps to ensure that the compensating distortion on the secondary signal path 209 remains substantially in phase with the RF signal on the primary signal path 201. In one embodiment, the primary signal path 201 may include a configurable delay segment that is selectively configured, for example, in response to control signals from the controller 260, to provide at least two different delay settings for at least two different RF loading conditions. One example of a configurable delay segment is described in commonly-owned U.S. patent application Ser. No. 12/976,136 filed Dec. 22, 2010 and entitled SYSTEM AND METHOD FOR DISTORTION COMPENSATION INCLUDING CONFIGURABLE DELAY, which is incorporated herein by reference.

The secondary path 209 of the distortion compensation circuit 200 also includes a frequency detector circuit 210 for detecting a frequency loading condition of the multichannel RF signal. The generation of distortion products by the distortion generator circuit(s) 220 may be adjusted in response to the frequency loading condition detected by the frequency detector circuit 210 such that the generated distortion products are capable of compensating for the frequency dependent distortion under the detected frequency loading condition. In one embodiment, for example, a controller 260 receives an output of the frequency detector circuit 210 and controls the generation of distortion products accordingly, as will be described in greater detail below. Although the frequency detector circuit 210 is shown on the secondary path 209 in the exemplary embodiment, a frequency detector circuit 210a may also be located on the primary signal path 201 and/or a frequency detector circuit 210b may be located before the splitter 206.

The secondary signal path 209 may also include one or more gain control elements (not shown), such as a variable attenuator and/or an amplifier, before and/or after the compensating distortion generator circuit 220 to control a magnitude of the compensating distortion generated by the distortion generator circuit 220. Variable gain control elements help to ensure that the magnitude of the compensating distortion corresponds sufficiently to the magnitude of the distortion being compensated. The variable attenuators may be PIN attenuators and may receive attenuation control signals from a controller (e.g., controller 160 shown in FIG. 1) to adjust the attenuation as needed. The secondary signal path 209 may also include a delay element or a configurable delay segment to add small amounts of delay in the secondary signal path, for example, to "zero" out any path length differences.

Figure 3:
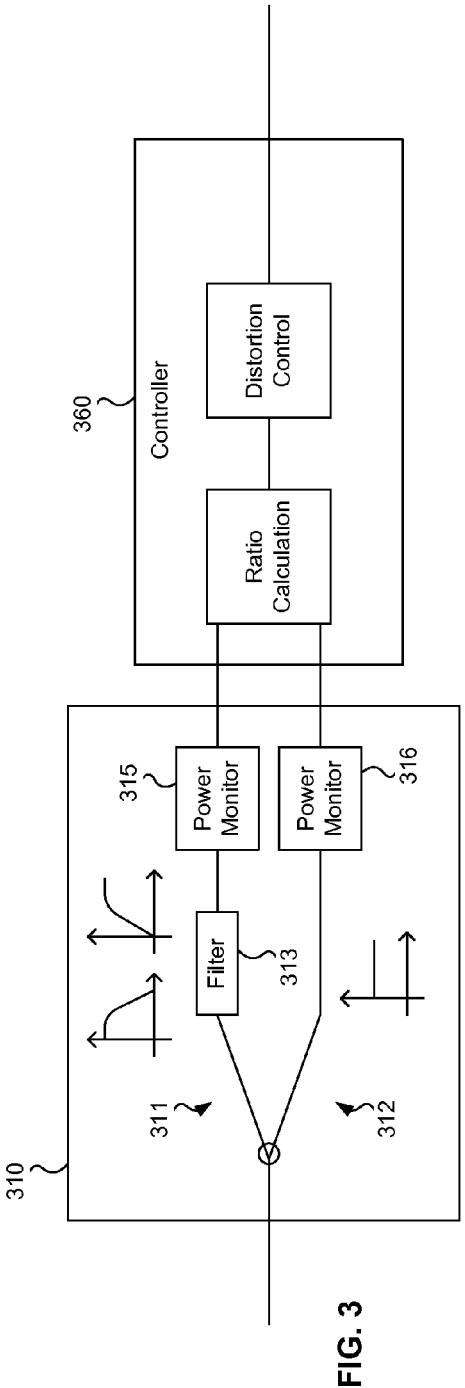
FIG. 3 is a schematic block diagram of a frequency detector circuit, consistent with an embodiment of the invention.

Referring to FIG. 3, an embodiment of a frequency detector circuit 310 for use with a distortion compensation circuit in a multichannel RF system is shown and described. The frequency detector circuit 310 may include a frequency dependent power monitor path 311 and a frequency independent power monitor path 312. When the frequency detector circuit 310 is located in the secondary signal path of a distortion compensation circuit, for example, the power monitor paths 311, 312 may be tapped off of the secondary signal path. The frequency dependent power monitor path 311 includes a filter 313 that filters the multichannel RF signal and a first power monitor 315 that produces a frequency dependent power monitor output representative of measured input power of the filtered RF signal. The frequency independent power monitor path 312 includes a second power monitor 315 that produces a frequency independent power monitor output representative of measured input power of the unfiltered RF signal.

The filter 313 may include a high pass filter that attenuates lower frequencies of the RF signal below a cutoff frequency. Although a high pass filter may be advantageous in a QAM transmitter, the filter 313 may also include a low pass filter that attenuates higher frequencies of the RF signal above a cutoff frequency. As shown by the graphical representations of signal power versus frequency (i.e., frequency response) in FIG. 3, the signal power of the filtered RF signal on the frequency dependent power monitor path 311 changes (i.e., either increases or decreases) as a function of frequency and the signal power of the unfiltered RF signal on the frequency independent power monitor path 312 remains substantially constant as a function of frequency. By taking the ratio of the frequency dependent power monitor output and the frequency independent power monitor output, the center position may be detected for the selected number of continuous channels of the RF signal, which is indicative of the frequency loading condition.

In the illustrated embodiment, a controller 360 receives the frequency dependent power monitor output and the frequency independent power monitor output and calculates the ratio of the power monitor outputs. The controller 360 controls distortion generation, at least in part, in response to the ratio representing the frequency loading condition. The controller 360 may control distortion generation, for example, by changing a bias current provided to a diode pair in a distortion generator circuit, as described in greater detail below.

Figure 4:
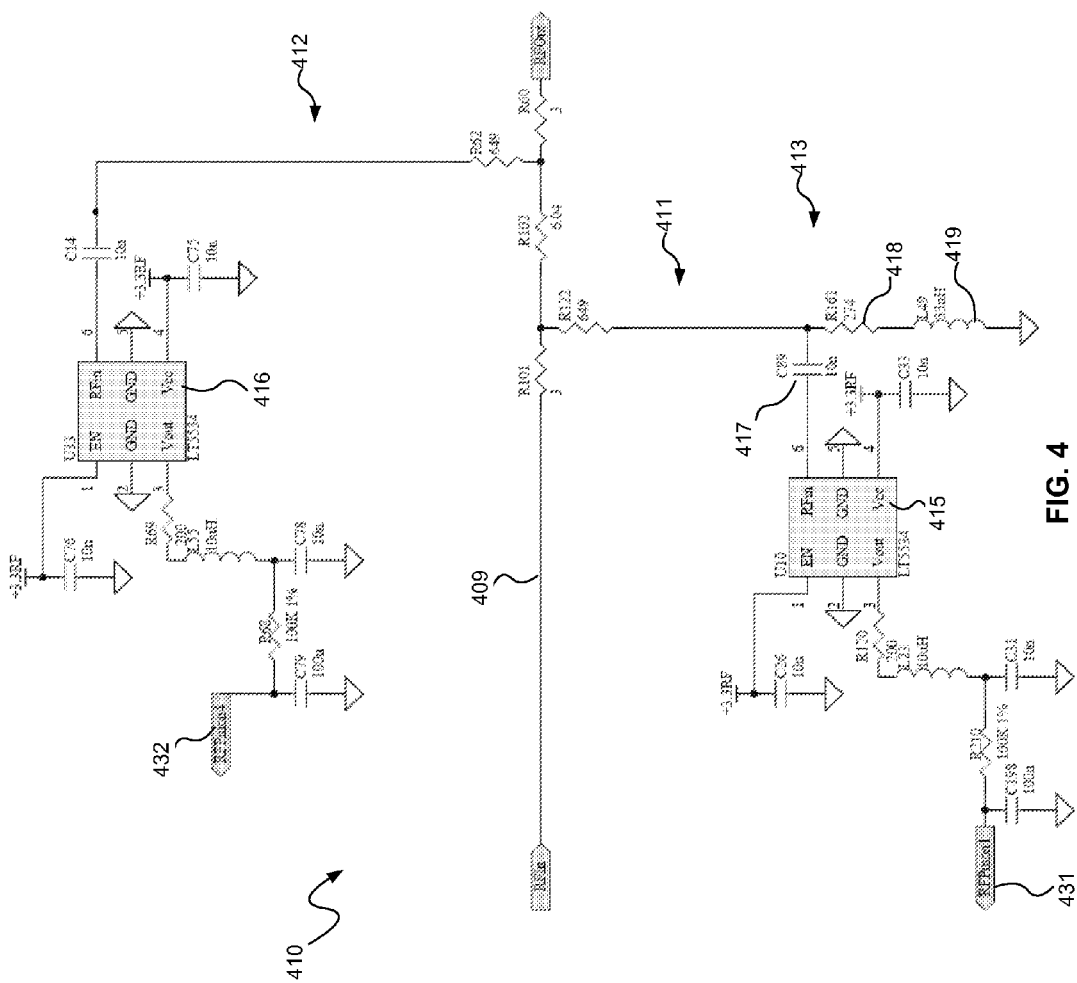
FIG. 4 is a schematic circuit diagram of a frequency detector circuit, consistent with an embodiment of the invention.

FIG. 4 shows one example of a frequency detector circuit 410 capable of being used in a QAM transmitter having a frequency range of about 500 MHz to 1 GHz. As shown, a frequency dependent power monitor path 411 and a frequency independent power monitor path 412 may be tapped off of an RF signal path 409, such as the secondary signal path in a predistortion circuit. In this embodiment, the frequency dependent power monitor path 411 includes a simple high pass filter 413 including a capacitor 417 in series with the signal path 411 and a resistor 418 and inductor 419 in series across the path 411. The frequency dependent power monitor path 411 also includes a first power monitor 415 for monitoring power of the filtered RF signal passing through the high pass filter 413 and producing a frequency dependent power monitor output 431. The frequency independent power monitor path 412 includes a second power monitor 416 for monitoring power of the unfiltered RF signal and producing a frequency independent power monitor output 432. The power monitors 415, 416 may be RF power detectors capable of measuring RF signals, such as the type available as part number LT5534 from Linear Technology. The power monitor outputs 431, 432 may be provided to a controller, such as an optical transmitter microprocessor, for calculating the ratio and controlling distortion generation.

Although a simple high pass filter 413 is shown, other high pass filter configurations, including a more sophisticated high pass filter, may also be used. In other embodiments, both paths 411, 412 may include high pass filter circuit components, which may be adjusted in either path to optimize the frequency response for a particular RF system.

Figure 5:
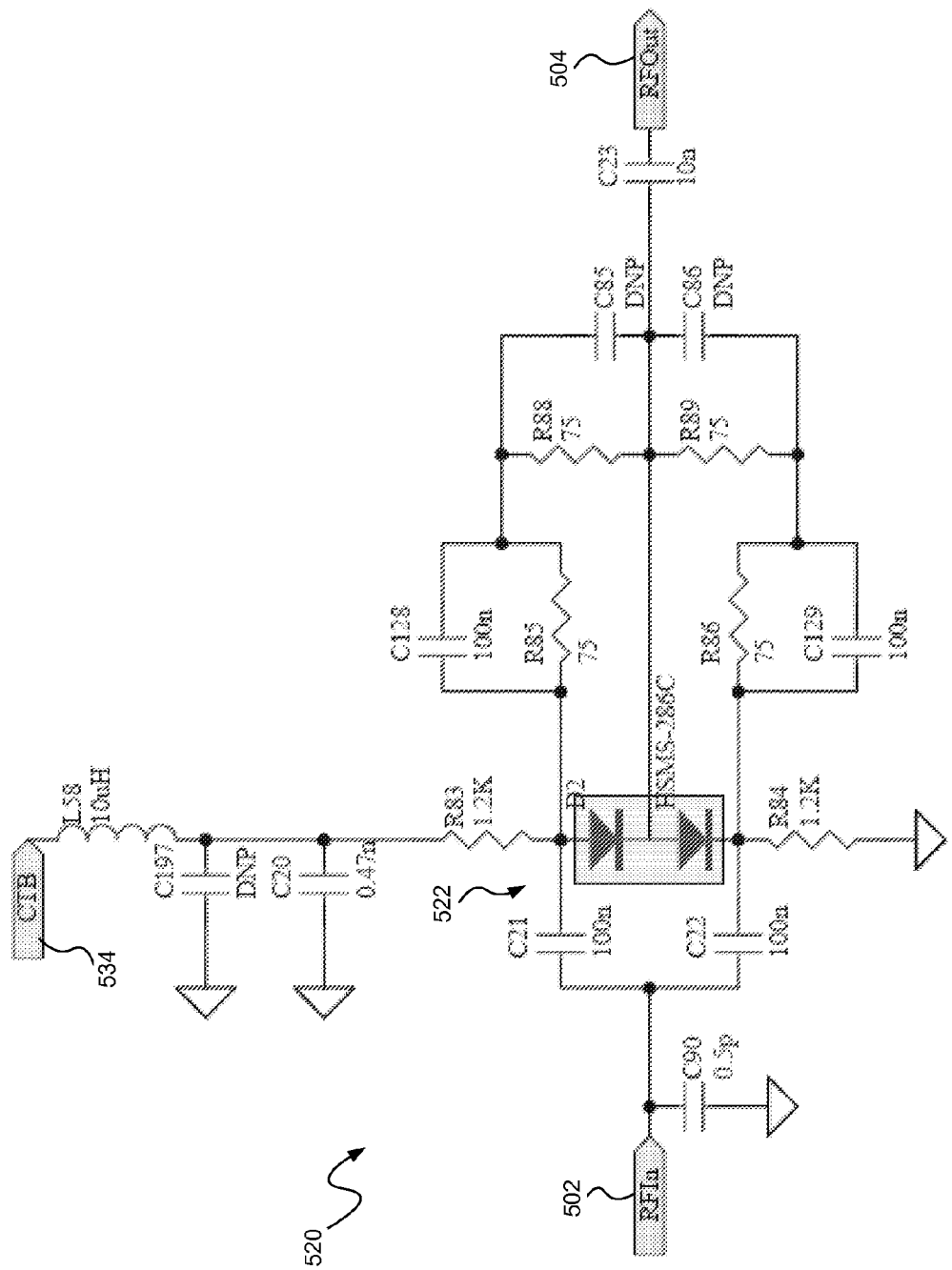
FIG. 5 is a schematic circuit diagram of a distortion compensation circuit with adjustable distortion compensation in response to detected frequency loading conditions, consistent with an embodiment of the present invention.

FIG. 5 shows one example of a distortion generator circuit 520 for generating compensating CTB distortion products. The distortion generator circuit 520 includes an RF input 502 and an RF output 504 and a diode pair 522. An adjustable bias current 534 may be provided to the diode pair 522 to control the generation of distortion products. The adjustable bias current 534 may be changed by a controller in response to calculation of the ratio of power monitor outputs representing the frequency loading condition to adjust the generation of distortion products.

Where CTB is mainly due to the dispersion of the fiber, for example, CTB amplitude is higher when the frequency loading is higher. Because the frequency dependent power monitor path 411 with a high pass filter 413 is used, higher frequency loads will cause the power monitor output 431 to be higher and thus the ratio of the power monitor output 431 to the power monitor output 432 will be higher. When the controller detects the higher power ratio, the controller may increase the bias current 534 to the distortion generator circuit 520, thereby increasing the CTB generated by the distortion generator circuit 520 to compensate for the increased CTB due to higher frequency loading.

Accordingly, the distortion compensation circuits that detect frequency loading conditions and adjust distortion generation with different frequency loading conditions, as described herein, may significantly improve distortion compensation in systems that operate in different modes with different RF loading conditions.

Consistent with one embodiment, a distortion compensation circuit is provided for compensation of distortion produced by at least one non-linear element in an RF system capable of multiple channel operation modes with different frequency loading conditions. The distortion compensation circuit includes a frequency detector circuit for detecting a frequency loading condition of a multichannel RF signal and at least one compensating distortion generator circuit configured to genera//te intermodulation distortion products from the multichannel RF signal. The distortion generator circuit is configured to generate intermodulation distortion products for different frequency loading conditions. The distortion generator circuit is also configured to adjust generation of intermodulation distortion products responsive, at least in part, to detecting the frequency loading condition such that the intermodulation distortion products are capable of compensating for distortion produced by the non-linear element in the RF system in each of the channel operation modes.

Consistent with another embodiment, a frequency detector is provided for detecting a frequency loading condition in a multichannel RF system capable of multiple channel operation modes with different frequency loading conditions. The frequency detector includes a frequency dependent power monitor path for receiving a multichannel RF signal. The frequency dependent power monitor path includes a filter configured to filter the multichannel RF signal and a first power monitor configured to produce a frequency dependent power monitor output representing power of the filtered multichannel RF signal. The frequency detector also includes a frequency independent power monitor path for receiving the multichannel RF signal. The frequency independent power monitor path includes a second power monitor configured to produce a frequency independent power monitor output representing power of the multichannel RF signal. A ratio of the frequency dependent power monitor output and the frequency independent power monitor output represents a frequency loading condition.

Consistent with a further embodiment, there is provided an optical transmitter capable of multiple channel operations modes with different frequency loading conditions. The optical transmitter includes an RF signal input configured to provide a multichannel RF signal and a frequency detector circuit for detecting a frequency loading condition of the multichannel RF signal. The optical transmitter also includes a predistortion circuit configured to receive the RF input signal and to generate a predistorted RF input signal. The predistortion circuit includes a primary signal path configured to receive at least a portion of the RF input signal and a secondary signal path coupled to the primary signal path and configured to receive at least a portion of the input signal. The primary signal path includes a delay segment for delaying the RF signal carried on the primary signal path. The secondary signal path includes at least one compensating distortion generator circuit configured to produce intermodulation distortion products from the RF input signal on the secondary path. The distortion generator circuit is configured to generate intermodulation distortion products for different frequency loading conditions and is configured to adjust generation of intermodulation distortion products responsive, at least in part, to detecting the frequency loading condition such that the intermodulation distortion products are capable of compensating for distortion produced by the non-linear element in the RF system in each of the channel operation modes. The predistortion circuit is configured to combine the intermodulation distortion products on the secondary signal path with the delayed RF signal on the primary signal path to produce the predistorted RF input signal. The optical transmitter also includes a laser configured to receive the predistorted RF input signal and to generate a modulated optical output. The predistorted RF input signal compensates for distortion generated by at least the laser. The optical transmitter further includes a controller coupled to the frequency detector circuit and the predistortion circuit and configured to control adjustment of generation of the intermodulation distortion products responsive to at least one output from the frequency detector circuit.

Consistent with yet another embodiment, a method is provided for compensating for distortion produced by at least one non-linear element in a multichannel RF system capable of multiple channel operation modes with different frequency loading conditions. The method includes: providing a distortion compensation circuit including a primary signal path and at least one secondary signal path coupled to the primary signal path; receiving a portion of a multichannel RF signal on the primary signal path; causing the multichannel RF signal to be delayed on the primary signal path; receiving a portion of the multichannel RF signal on the secondary signal path; detecting a frequency loading condition of the multichannel RF signal; generating compensating distortion from the multichannel RF signal on the secondary signal path responsive, at least in part, to the detected frequency loading condition; and combining the compensating distortion on the secondary signal path with the delayed RF signal on the primary path to produce the multichannel RF signal with compensating distortion.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A distortion compensation circuit for compensation of distortion produced by at least one non-linear element in an RF system capable of multiple channel operation modes with different frequency loading conditions resulting from different ranges of frequencies of multichannel RF signals received by the distortion compensation circuit during different respective multiple channel operation modes, the distortion compensation circuit comprising:
   a frequency detector circuit for detecting a frequency loading condition of a multichannel RF signal; and
   at least one compensating distortion generator circuit configured to generate intermodulation distortion products from the multichannel RF signal, wherein the distortion generator circuit is configured to generate intermodulation distortion products for different frequency loading conditions, and wherein the distortion generator circuit is configured to adjust generation of intermodulation distortion products responsive, at least in part, to detecting the frequency loading condition such that the intermodulation distortion products are capable of compensating for distortion produced by the non-linear element in the RF system in each of the channel operation modes.

2. The distortion compensation circuit of claim 1 wherein the frequency detector circuit comprises:
   a frequency dependent power monitor path including a filter configured to filter the multichannel RF signal and a first power monitor configured to produce a frequency dependent power monitor output representing power of the filtered RF signal; and
   a frequency independent power monitor path including a second power monitor configured to produce a frequency independent power monitor output representing power of the RF signal, wherein a ratio of the frequency dependent power monitor output and the frequency independent power monitor output is representative of the frequency loading condition.

3. The distortion compensation circuit of claim 2 further comprising:
   a controller configured to receive the frequency dependent power monitor output and the frequency independent power monitor output, to calculate the ratio of the power monitor outputs, and to control the generation of distortion products in the distortion generator circuit in response to the ratio.

4. The distortion compensation circuit of claim 2 wherein the filter is a high pass filter.

5. The distortion compensation circuit of claim 1 wherein the distortion generator circuit is a composite triple beat (CTB) distortion generator circuit configured to produce third-order intermodulation distortion products from the RF signal.

6. The distortion compensation circuit of claim 1 wherein the distortion generator circuit is a composite second order (CSO) distortion generator circuit configured to produce second-order intermodulation distortion products from the RF signal.

7. The distortion compensation circuit of claim 1 wherein the distortion generator circuit includes at least a pair of diodes, and wherein the distortion generator circuit is configured to adjust the generation of intermodulation distortion products by receiving an adjustable diode bias current.

8. The distortion compensation circuit of claim 7 further comprising:
   a controller configured to receive at least one output from the frequency detector circuit and to adjust the adjustable diode bias current in response to the output from the frequency detector circuit.

9. The distortion compensation circuit of claim 8 wherein the frequency detector circuit comprises:
   a frequency dependent power monitor path including a filter configured to filter the multichannel RF signal and a first power monitor configured to produce a frequency dependent power monitor output representing power of the filtered RF signal; and
   a frequency independent power monitor path including a second power monitor configured to produce a frequency independent power monitor output representing power of the RF signal; and
   wherein the controller is configured to calculate a ratio of the frequency dependent power monitor output and the frequency independent power monitor output, the ratio of the power monitor outputs being representative of the frequency loading condition.

10. A frequency detector for detecting a frequency loading condition in a multichannel RF system capable of multiple channel operation modes with different frequency loading conditions, the frequency detector comprising:
    a frequency dependent power monitor path for receiving a multichannel RF signal, the frequency dependent power monitor path including a filter configured to filter the multichannel RF signal and a first power monitor configured to produce a frequency dependent power monitor output representing power of the filtered multichannel RF signal; and
    a frequency independent power monitor path for receiving the multichannel RF signal, the frequency independent power monitor path including a second power monitor configured to produce a frequency independent power monitor output representing power of the multichannel RF signal, wherein a ratio of the frequency dependent power monitor output and the frequency independent power monitor output represents a frequency loading condition.

11. The frequency detector of claim 10 wherein the filter is a high pass filter.

12. The frequency detector of claim 10 further comprising:
    a controller configured to receive the frequency dependent power monitor output and the frequency independent power monitor output, to calculate the ratio of the power monitor outputs, and to control generation of distortion products in a compensating distortion generator in response to the ratio.

13. The frequency detector of claim 10 wherein the frequency loading condition includes a range of frequencies between about 50 MHz and 1 GHz.

14. An optical transmitter capable of multiple channel operations modes with different frequency loading conditions, the optical transmitter comprising:
    an RF signal input configured to provide a multichannel RF signal;
    a frequency detector circuit for detecting a frequency loading condition of the multichannel RF signal;
    a predistortion circuit configured to receive the RF input signal and to generate a predistorted RF input signal, the predistortion circuit comprising a primary signal path configured to receive at least a portion of the RF input signal and a secondary signal path coupled to the primary signal path and configured to receive at least a portion of the input signal, the primary signal path including a delay segment for delaying the RF signal carried on the primary signal path, and the secondary signal path including at least one compensating distortion generator circuit configured to produce intermodulation distortion products from the RF input signal on the secondary path, wherein the distortion generator circuit is configured to generate intermodulation distortion products for different frequency loading conditions, wherein the distortion generator circuit is configured to adjust generation of intermodulation distortion products responsive, at least in part, to detecting the frequency loading condition such that the intermodulation distortion products are capable of compensating for distortion produced by the non-linear element in the RF system in each of the channel operation modes, and wherein the predistortion circuit is configured to combine the intermodulation distortion products on the secondary signal path with the delayed RF signal on the primary signal path to produce the predistorted RF input signal;

a laser configured to receive the predistorted RF input signal and to generate a modulated optical output, wherein the predistorted RF input signal compensates for distortion generated by at least the laser; and a controller coupled to the frequency detector circuit and the predistortion circuit and configured to control adjustment of generation of the intermodulation distortion products responsive to at least one output from the frequency detector circuit.

15. The optical transmitter of claim 14 wherein the frequency detector circuit comprises:
a frequency dependent power monitor path including a filter configured to filter the multichannel RF signal and a first power monitor configured to produce a frequency dependent power monitor output representing power of the filtered RF signal; and
a frequency independent power monitor path including a second power monitor configured to produce a frequency independent power monitor output representing power of the RF signal; and
wherein the controller is configured to calculate a ratio of the frequency dependent power monitor output and the frequency independent power monitor output, the ratio of the power monitor outputs being representative of the frequency loading condition, and wherein the controller is configured to control adjustment of generation of the intermodulation distortion products responsive to the ratio of the power monitor outputs.

16. The optical transmitter of claim 14 wherein the distortion generator circuit includes at least a pair of diodes, and wherein the distortion generator circuit is configured to adjust the generation of intermodulation distortion products by receiving an adjustable diode bias current.

17. The optical transmitter of claim 16 wherein the frequency detector circuit comprises:
a frequency dependent power monitor path including a filter configured to filter the multichannel RF signal and a first power monitor configured to produce a frequency dependent power monitor output representing power of the filtered RF signal; and
a frequency independent power monitor path including a second power monitor configured to produce a frequency independent power monitor output representing power of the RF signal; and
wherein the controller is configured to calculate a ratio of the frequency dependent power monitor output and the frequency independent power monitor output, the ratio of the power monitor outputs being representative of the frequency loading condition.

18. The optical transmitter of claim 14 wherein the multiple channel operation modes include QAM channel modes.

19. The optical transmitter of claim 18 wherein the QAM channel modes include 15, 32, 50 or 153 channel QAM modes.

20. A method of compensating for distortion produced by at least one non-linear element in a multichannel RF system capable of multiple channel operation modes with different frequency loading conditions resulting from different ranges of frequencies of multichannel RF signals received by a distortion compensation circuit during different respective multiple channel operation modes, the method comprising:
providing a distortion compensation circuit including a primary signal path and at least one secondary signal path coupled to the primary signal path;
receiving a portion of a multichannel RF signal on the primary signal path;
causing the multichannel RF signal to be delayed on the primary signal path;
receiving a portion of the multichannel RF signal on the secondary signal path;
detecting a frequency loading condition of the multichannel RF signal;
generating compensating distortion from the multichannel RF signal on the secondary signal path responsive, at least in part, to the detected frequency loading condition; and
combining the compensating distortion on the secondary signal path with the delayed RF signal on the primary path to produce the multichannel RF signal with compensating distortion.

21. The method of claim 20 wherein detecting a frequency loading condition comprises:
filtering the RF signal and monitoring power of the filtered RF signal on a frequency dependent power monitor path to produce a frequency dependent power monitor output;
monitoring power of the RF signal on an independent power monitor path to produce a frequency independent power monitor output;
determining a ratio of the frequency dependent power monitor output and the frequency independent power monitor output, the ratio of the power monitor outputs being representative of the frequency loading condition.

22. The method of claim 20 wherein generating the distortion includes passing the RF signal through a distortion generator circuit including at least a pair of diodes.

23. The method of claim 22 further comprising adjusting a diode bias current provided to the distortion generator circuit to adjust generation of distortion responsive to the detected frequency loading condition.

24. The method of claim 20 wherein generating the distortion includes generating at least composite triple beat (CTB) distortion products.

25. The method of claim 20 wherein the multiple channel operation modes include QAM modes.

* * * * *